(12) United States Patent
Lefranc

(10) Patent No.: US 7,635,163 B2
(45) Date of Patent: Dec. 22, 2009

(54) VIBRATORY WARNING DEVICE AND SEAT PROVIDED THEREWITH

(75) Inventor: Francis Lefranc, Suresnes (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 157 days.

(21) Appl. No.: 10/598,699

(22) PCT Filed: Mar. 3, 2005

(86) PCT No.: PCT/FR2005/050143

§ 371 (c)(1),
(2), (4) Date: Sep. 11, 2006

(87) PCT Pub. No.: WO2005/087544

PCT Pub. Date: Sep. 22, 2005

(65) Prior Publication Data

US 2007/0210903 A1   Sep. 13, 2007

(30) Foreign Application Priority Data

Mar. 11, 2004   (FR) .................................. 04 50497

(51) Int. Cl.
*B60R 21/00* (2006.01)
*A47C 31/00* (2006.01)
(52) U.S. Cl. ................. 297/217.3; 297/216.1
(58) Field of Classification Search ............. 297/216.1, 297/217.3, 284.3, 284.5; 5/658, 915; 24/460, 24/462; 248/229.16
See application file for complete search history.

(56) References Cited

U.S. PATENT DOCUMENTS

| | | | | |
|---|---|---|---|---|
| 1,332,442 A | * | 3/1920 | Kane | 24/460 |
| 3,009,676 A | * | 11/1961 | Buchwald | 248/229.11 |
| 3,934,283 A | * | 1/1976 | Raffel | 5/109 |
| 5,927,056 A | * | 7/1999 | Renehan | 56/340.1 |
| 6,402,240 B1 | * | 6/2002 | Toba et al. | 297/217.3 |
| 6,431,646 B1 | * | 8/2002 | Longoria | 297/217.3 |
| 6,453,523 B1 | * | 9/2002 | Teidemann | 24/546 |
| 6,669,291 B1 | * | 12/2003 | Hsiao | 297/284.3 |
| 2005/0171458 A1 | * | 8/2005 | Luden et al. | 601/49 |

FOREIGN PATENT DOCUMENTS

| | | |
|---|---|---|
| DE | 4029657 A | 3/1992 |
| JP | 2000/020900 A | 1/2000 |
| JP | 2000/221051 A | 8/2000 |
| WO | WO 03/011638 A | 2/2003 |

OTHER PUBLICATIONS

International Search Report (ISR) mailed Jul. 28, 2005 in PCT/FR2005/050143.

* cited by examiner

*Primary Examiner*—Sarah B McPartlin
(74) *Attorney, Agent, or Firm*—Nicolas E. Seckel

(57) ABSTRACT

The invention relates to a vibratory warning device attachable to a structural element (2) such as a vehicle seat and including vibratory means (3,4,5) for generating mechanical vibration in response to a control signal, and attachment means (7,8,9) for securing the vibratory means (3,4,5) to a portion (6) of the structural element (2), characterized in that the attachment means comprise a resilient element (8) defining a gap (11) with an opening into which said portion (6) of the structural element (2) can be inserted in order to attach the device by clamping the resilient element (8) against said portion (6) of the structural element. The invention further relates to a seat provided with said device.

22 Claims, 3 Drawing Sheets

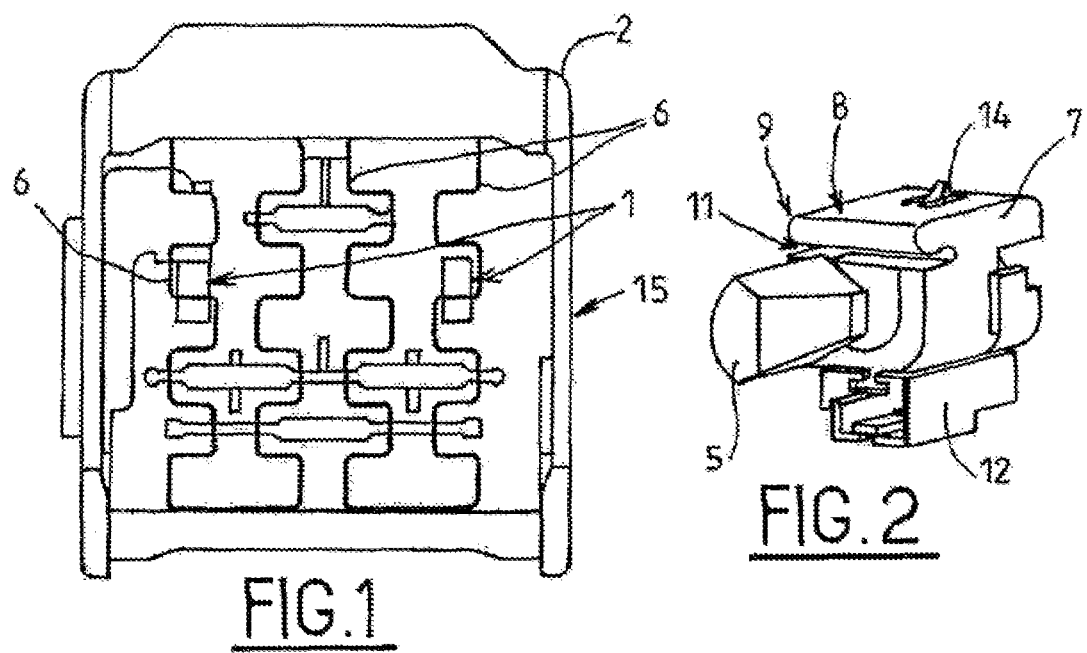
FIG.1
FIG.2
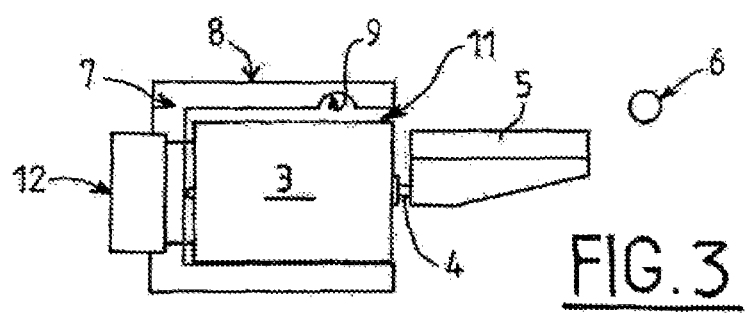
FIG.3
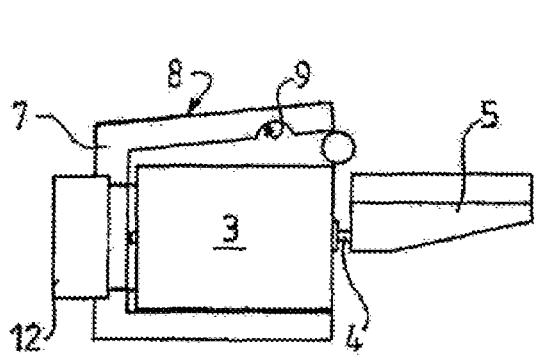
FIG.4
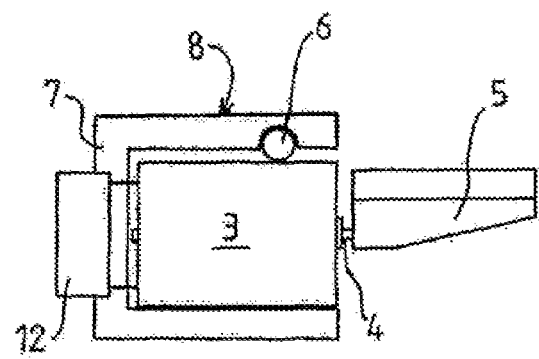
FIG.5

VIBRATORY WARNING DEVICE AND SEAT PROVIDED THEREWITH

BACKGROUND ART

The invention relates to a vibratory warning device as well as to a seat provided with such a device.

The invention concerns more particularly a warning device intended to be fixed to a structural element, such as a seat of a vehicle.

Such a device comprises vibratory means adapted to create a mechanical vibration under the effect of a control signal, and fixation means adapted to make integral the vibratory means and a portion of the structural element.

Document WO0311638 describes such a device in conformity with the preamble of the main claim, fixed on the structure of the sitting portion of a seat of a motor vehicle.

In this known system, the fixation of the warning device is provided by means of a flange maintained by screws so as to trap a metallic wire of the seat structure between the flange and a supple block. The supple block is itself supported on the casing of the motor of the warning device.

This warning device has a global operation that is satisfactory, however, its fixation is relatively complex and expensive. Indeed, in order to ensure the integral connection of the warning device with a wire, an operator must manipulate a flange and two screws. This requires using multiple parts and long and costly operations for large scale production.

BRIEF SUMMARY OF THE INVENTION

An objective of the present invention is to remedy all or part of the drawbacks of the prior art mentioned above.

To this end, the warning device according to the invention, which is otherwise conform to the generic definition given in the preamble above, is essentially characterized in that the fixation means comprise a resilient element defining a gap provided with an opening adapted to receive the portion of the structural element so as to ensure the fixation of the device by clamping of the resilient element on the portion of the structural element.

Further, the invention can comprise one or several of the following characteristics:
- the resilient element is shaped so as have a housing for the portion of the structural element and in that the housing opens into the gap,
- the gap is located between the resilient element and the vibratory means,
- the device comprises play compensation means disposed between the resilient element and the vibratory means,
- the device comprises play compensation means disposed between the resilient element and the portion of the structural element,
- the vibratory means are disposed in a casing, the resilient element being formed by at least a portion of a wall of said casing,
- the device comprises support means cooperating with the resilient element so as to limit or prevent the deformation of the latter in the direction of an enlargement of the gap,
- the support means are removably fitted on the casing,
- the support means apply a pressure on the resilient element in the direction of a narrowing of the gap,
- the device comprises play compensation means disposed between the resilient element and the support means,
- the play compensation means comprise a portion in a deformable material added to the resilient element or formed integrally with the same material as the latter,
- the play compensation means comprise a portion in a deformable material added to the support means or formed integrally with the same material as the latter, The invention also concerns a seat comprising at least one vibratory warning device in conformity with any one of the preceding characteristics.

According to another aspect, the seat comprises a wire grid frame comprising at least one wire, the fixation means of the at least one warning device being made integral with a portion of the wire.

BRIEF DESCRIPTION OF THE DRAWINGS

Other aspects and advantages will appear upon reading the following description made in reference to the drawings in which:

FIG. 1 is a top view of the frame of the sitting portion of a vehicle seat comprising two warning devices according to the invention, FIG. 2 is a perspective view of a warning device according to the invention, FIGS. 3 to 5 shows three steps, respectively, in the fixation of the device of FIG. 2 on a metallic wire.

DETAILED DESCRIPTION OF PARTICULAR EMBODIMENTS

Figure 6:
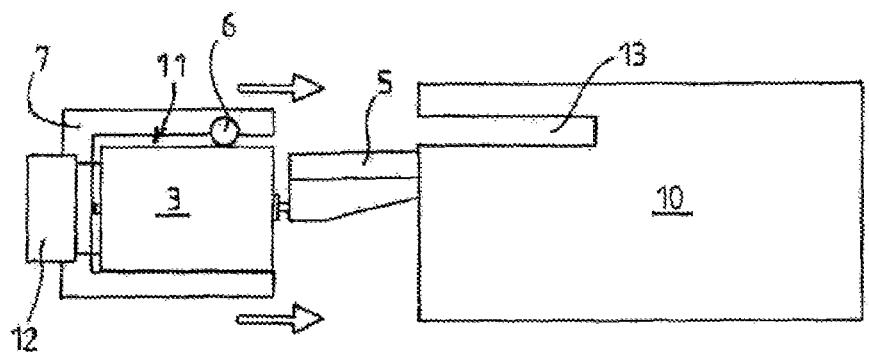
FIGS. 6 and 7 illustrate two additional steps in the fixation of the warning device on the wire.

Referring to FIGS. 2 and 3, the warning device 1 according to the invention comprises an electric motor 3 driving an axle 4 which has a flyweight 5 integral thereto. The flyweight 5 is constituted by a weight element fixed in an eccentric manner on the axle 4 so as to create an unbalance when the axle 4 is driven in rotation by the motor 3. Driving the unbalance in rotation triggers mechanical vibrations whose amplitude is a function of the speed at which the axle 4 is driven by the motor 3. Of course, the mechanical vibration generator described above can be replaced by any equivalent system.

The motor 3 is housed in a casing 7 having, for example, a generally parallelepipedic shape, and essentially U-shaped in longitudinal cross-section (FIG. 3). The motor 3 is fixed in the casing 7 by gluing and/or clipsing or by any other equivalent means.

Electrical connection means 12 making it possible to connect the motor 3 to supply cables (not shown) can be provided on the casing 7.

The flyweight 5 protrudes from the casing 7. One of the walls 8 of the casing 7, which has a free extremity, is spaced apart slightly from the motor 3. More precisely, a wall 8 defines a gap 11 between the engine 3 and the casing 7. The gap 11 has an opening making it possible to insert within it a metallic wire 6 of the seat structure.

The transversal dimensions of the gap 11 are lower than the transversal dimensions of the wire 6 so that the insertion of the wire 6 in the gap 11 is obtained by a slight deformation of the wall 8 of the casing 7 (FIG. 4). For example, the wall 8 deforms by flexion. The casing 7 is constituted, for example, by a material comprising plastic.

Thus, the casing 7 is supported on the wire 6 by clamping the latter between the wall 8 and the motor 3. The warning device 1 is thus clamped to the wire 6, which ensures a perfect transmission of the mechanical vibrations of the motor 3 toward the wire 6.

Advantageously, the wall 8 can be provided with a cavity forming a housing 9 for the wire 6. The housing 9 ensures a better blocking of the wire 6 in the gap 11 (FIGS. 4 and 5). The housing has, for example, a shape complementary to at least a portion of the outside shape of the support (housing in the shape of a groove in the case of a wire, for example).

To ensure a still improved clamping of the warning device 1 on its support (wire 6), additional support means 10 can be provided to cooperate with the elastic wall 8 of the casing 7, so as to limit or prevent the deformation of the latter in the direction of a widening of the gap 11.

Figure 9:
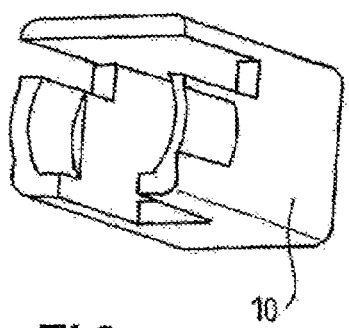
FIG. 9 is a perspective view of a detail of FIG. 6, illustrating support means according to a first embodiment of the invention.

The support means can be constituted, for example, by a second casing 10 having an open face to make it possible to fit it on the first casing 7 (cf. FIG. 9). To this effect, the second casing 10 comprises two grooves 13 adapted to make it possible to pass the wire 6. The first casing 7 and the second casing 10 can be kept integral with each other by complementary removable locking means. For example, the two casings 7, 10, can have complementary ratchet means (cf. FIG. 2, the elastic tongue 14 adapted to cooperate with a complementary housing located within the second casing 10).

The second casing 10 has dimensions selected so as to apply a pressure on the wall 8 in the direction of a narrowing of the gap 11. Thus, an especially secure mechanical connection is provided between the metallic wire 6 and the warning device 1.

Figure 7:
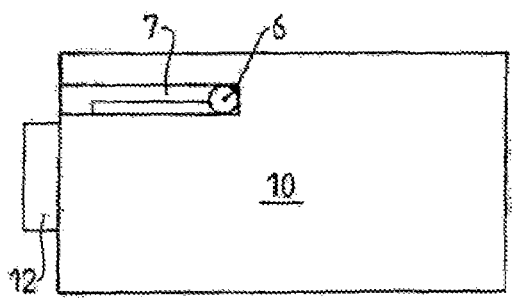
Figure 8:
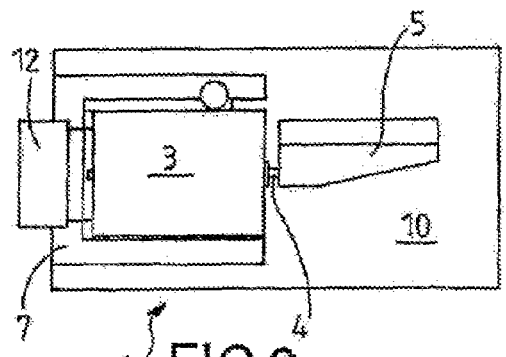
FIG. 8 is a schematic cross-section view of FIG. 7 illustrating the warning device fixed to the metallic wire.
Figure 10:
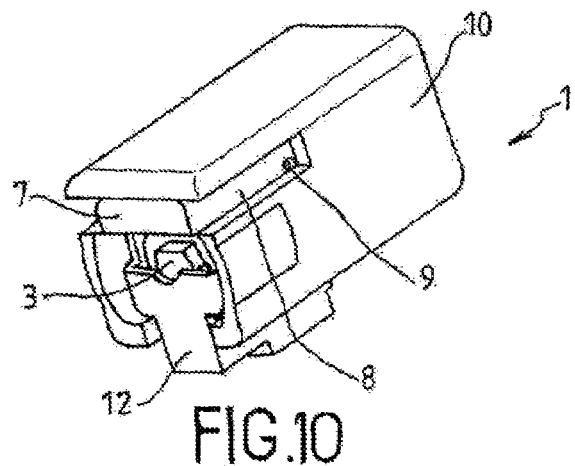
FIG. 10 is a perspective view of the warning device according to the embodiment of FIG. 7.

As shown in FIGS. 7, 8, and 10, the second casing 10 can be given dimensions so as to receive within it the first casing 7 as well as the vibrating flyweight 5.

Thus, when the warning device 1 is fixed by means of the two casings 7, 10, the wire 9 cannot escape accidentally through the gap 11 of the first casing 7.

FIG. 1 illustrates an example of a non-limitative use of the warning device 1 according to the invention. The frame 15 of the sitting portion of a seat shown on FIG. 1 comprises a grid constituted by metallic wires. Two vibratory warning devices 1 are fixed to two respective wires 6. The two devices can be coupled, in a known manner, to a lateral trajectory monitoring system, so as to indicate to the user of the vehicle who is seated on his or her seat that the trajectory is deriving (one warning device per side).

Figure 11:
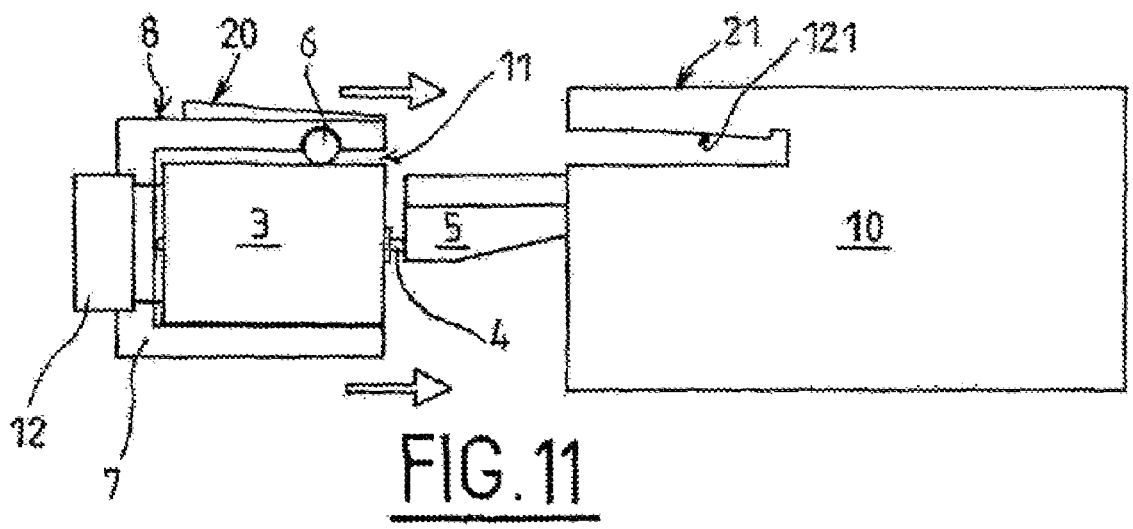
FIG. 11 illustrates, in a manner analogous to FIG. 6, a step in the fixation of the warning device to a wire according to a second embodiment of the invention.
Figure 12:
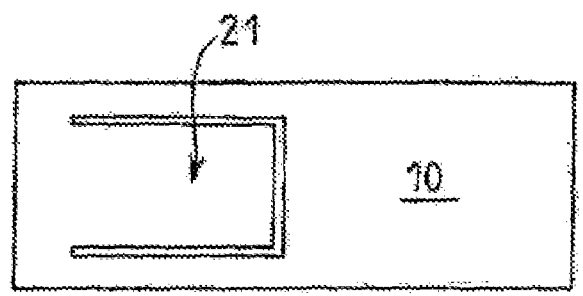
FIG. 12 is a top view of a detail of FIG. 9, illustrating support means according to the second embodiment of the invention.
Figure 13:
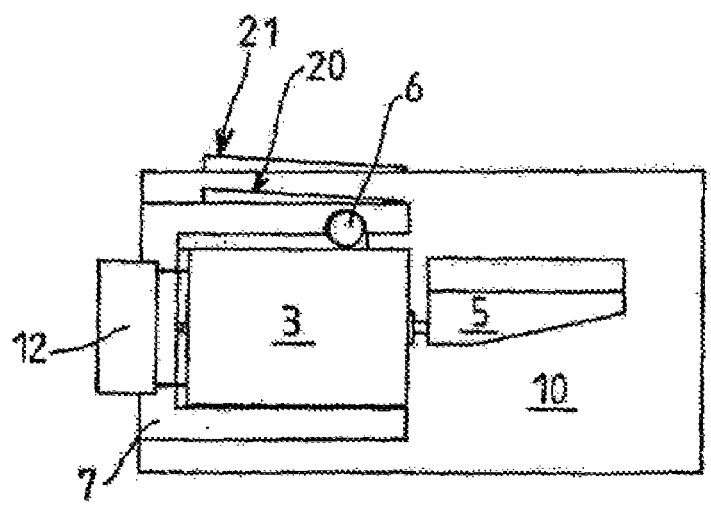
FIG. 13 is a schematic cross-section view of FIG. 9 illustrating the warning device fixed to the metallic wire.

FIGS. 11 to 13 illustrate another advantageous embodiment of the invention. For simplification, the elements identical to those described above are designated by the same numerical reference and are not described in details anymore.

The embodiment of FIG. 11 is distinguished from that of FIG. 6 only in that play compensation means 20 are provided between the first casing 7 and the second casing 10. The play compensation means 20 are disposed, for example, on one or several outside faces of the first casing 7, preferably on the elastic wall 8. The play compensation means 20 comprise, for example, a portion 20 or a layer in a deformable material located on the outside face of the wall 8. For example, a layer in an elastic material such as silicone or rubber is added to the wall 8. The layer has, for example, a thickness that decreases in the direction of the free extremity of the wall 8. The elastic layer 20 is intended to cooperate with the second casing 10 to compensate the possible dimensional play between these two parts. The parasitic noises are thus suppressed or at least reduced.

In the same manner, the second casing 10 can comprise play compensation means 21. In particular, as shown on FIGS. 11 to 13, the second casing 10 can comprise play compensation means 21 complementary to the play compensation means 20 of the first casing 7. For example, the second casing 10 comprises a cut in one of its faces forming an elastic tongue 21 intended to cooperate by contact and pressure with the elastic layer 20 of the first casing 7. In other words, when the first casing 7 is engaged with the second casing 10, the relative dimensions of the two parts 7, 10, lead to a deformation of the tongue 21 (see FIG. 13). More precisely, the tongue 21 of the second casing 10 maintains an elastic pressure on the layer 20 and thus on the first casing 7. Advantageously, the face 121 of the tongue 21 intended to come in contact with the elastic layer 20 can have a profile complementary to that of the elastic layer 20 (for example, an inclined plane, see FIG. 11).

Of course, the invention is not limited to this exemplary embodiment. Thus, the elastic layer 20 can be constituted by any other appropriate material. In addition, the elastic layer or portion 20 can be formed integrally with the material of the wall 7. In other words, the material forming the wall 8 (and/or the casing) can have elastic physical properties ensuring this play compensation. In this manner, it is not necessary to provide an operation consisting in applying a layer on the casing 7. For example, the wall 8 and/or of the casing 7, 10, can be constituted by a material of the type designated by the reference PAA6.

Similarly, it is possible to provide play compensation means such as those described above between the wall 8 and the motor 3 or on other parts of the motor 3, or the casings 7, 10.

Thus, while it has a simple and inexpensive construction, the invention makes it possible to provide a quick, simple, and secure fixing of a warning device on a support.

The invention claimed is:

1. Vibratory warning device intended to be fixed to a structural element, such as a seat of a vehicle, comprising:
    vibratory means adapted to create a mechanical vibration under the effect of a control signal,
    fixation means adapted to make integral the vibratory means and a portion of the structural element,
    wherein the fixation means comprise a casing in which a motor of the vibratory means is fixed,
    said casing comprising a resilient element formed in one piece with the casing, wherein the resilient element has an end integrally fixed with the casing and the motor of the vibratory means, and another free end defining a gap having a width, said gap being located between the resilient element and the vibratory means, said gap being provided with an opening adapted to receive the portion of the structural element so as to ensure the fixation of the device by clamping of the resilient element on the portion of the structural element,
    wherein the free end of the resilient element is capable of being deformed to widen the gap to allow insertion of the structural element, while being naturally biased to narrow the gap to ensure fixation of the structural element.

2. Warning device according to claim 1, wherein the resilient element is shaped so as to have a housing for the portion of the structural element and the housing opens into the gap.

3. Warning device according to claim 1, which comprises play compensation means disposed between the resilient element and the vibratory means.

4. Warning device according to claim 1, which comprises play compensation means disposed between the resilient element and the portion of the structural element.

5. Warning device according to claim 1, which comprises support means cooperating with the resilient element so as to limit or prevent the deformation of the latter in the direction of an enlargement of the gap.

6. Warning device according to claim 5, wherein the support means are removably fitted on the resilient element.

7. Warning device according to claim 5, wherein the support means apply a pressure on the resilient element in the direction of a narrowing of the gap.

8. Warning device according to claim 5, which comprises play compensation means disposed between the resilient element and the support means.

9. Warning device according to claim 8, wherein the play compensation means comprise a portion in a deformable material added to the resilient element or formed integrally with the material of the latter.

10. Warning device according to claim 8, wherein the play compensation means comprise a portion in a deformable material added to the support means or formed integrally with the material of the latter.

11. Warning device according to claim 5, wherein the fixation means comprises a first casing comprising the resilient element, and the support means comprises a second casing having an open face so that it is capable of fitting on the first casing.

12. Warning device according to claim 11, wherein the second casing comprises two grooves adapted to pass the structural element.

13. Warning device according to claim 11, wherein the first casing and the second casing are equipped with complementary removable locking means.

14. Motor vehicle seat, which comprises at least one vibratory warning device according to claim 1.

15. Seat according to claim 14, comprising a wire grid frame comprising at least one wire wherein the fixation means of at least one warning device are made integral with a portion of the wire.

16. Warning device according to claim 1, wherein the vibratory means is disposed in a casing and the resilient element is formed by at least a portion of a wall of said casing.

17. Warning device according to claim 1, which comprises support means cooperating with the resilient element so as to limit or prevent the deformation of the latter in the direction of an enlargement of the gap.

18. Warning device according to claim 17, wherein the support means comprises a second casing having an open face so that it is capable of fitting on the first casing.

19. Warning device according to claim 1, wherein the free end of the resilient element is flexibly deformed to widen the gap to allow insertion of the structural element.

20. Vibratory warning device intended to be fixed to a structural element, such as a seat of a vehicle, comprising:
vibratory means adapted to create a mechanical vibration under the effect of a control signal,
fixation means adapted to make integral the vibratory means and a portion of the structural element,
wherein the fixation means comprises a first casing comprising a resilient element defining a gap having a width, said gap being located between the resilient element and the vibratory means, said gap being provided with an opening adapted to receive the portion of the structural element so as to ensure the fixation of the device by clamping of the resilient element on the portion of the structural element,
wherein the resilient element is flexible such that it is capable of being flexibly deformed to widen the gap to allow insertion of the structural element, while being naturally biased to narrow the gap to ensure fixation of the structural element, and
wherein the warning device comprises support means cooperating with the resilient element so as to limit or prevent the deformation of the latter in the direction of an enlargement of the gap, wherein the support means comprises a second casing having an open face so that it is capable of fitting on the first casing.

21. Warning device according to claim 20, wherein the second casing comprises two grooves adapted to pass the structural element.

22. Warning device according to claim 20, wherein the first casing and the second casing are equipped with complementary removable locking means.

* * * * *